United States Patent Office 2,847,401
Patented Aug. 12, 1958

2,847,401

INTERPOLYMERS OF VINYLENE CARBONATE WITH HALO-SUBSTITUTED ETHYLENES

Earl W. Gluesenkamp and John D. Calfee, Dayton, Ohio, assignors to Monsanto Chemical Company, St. Louis, Mo., a corporation of Delaware No Drawing. Application December 5, 1955
Serial No. 550,827

18 Claims. (Cl. 260—77.5)

This invention relates to a new polymerization process, and new interpolymers. In some of its aspects the invention pertains to particular procedures for effecting the interpolymerization of vinylene carbonate with one or more halo-substituted ethylenes. Certain aspects of the invention relate to polymers of vinyl halides and vinylidene halides modified by the inclusion therein of minor amounts of vinylene carbonate as comonomer.

In accordance with the present invention, vinylene carbonate is interpolymerized with a halo-substituted ethylene, i. e., vinylene carbonate is interpolymerized with a monomeric material comprising at least one halo-substituted ethylene as an essential polymerizable constituent thereof. The invention in its broadest aspects is generic to interpolymers of vinylene carbonate with any halo-substituted ethylene compolymerizable therewith, and to any process for obtaining said interpolymer. From the practical and commercial viewpoint, however, certain halo-substituted ethylenes are preferred, and among these are particularly the vinyl halides, especially vinyl chloride and vinyl fluoride, and the vinylidene halides, especially vinylidene chloride, vinylidene fluoride, and vinylidene chlorofluoride. In certain preferred embodiments, vinylene carbonate is interpolymerized with a halo-substituted ethylene at pressures of at least 5,000 pounds per square inch, and preferably at pressures within the range of 15,000 to 40,000 pounds per square inch.

Properties of vinylene carbonate and methods of preparing same are described by Newman and Abdor, Jour. Amer. Chem. Soc. 75, 1263, March 5, 1953. Vinylene carbonate has the structural formula:

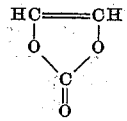

A suitable method of preparing vinylene carbonate is chlorination of ethylene carbonate to form monochloroethylene carbonate, followed by dehydrochlorination of the latter by reaction with an amine, resulting in vinylene carbonate.

One of the principal advantages realized in the present invention, is the increased flexibility and processability of the halo-substituted ethylene polymers obtained by interpolymerization of halo-substituted ethylenes with vinylene carbonate, as compared with the homopolymers of the same halo-substituted ethylenes. While it has been known heretofore to modify the polymerization of halo-substituted ethylenes by inclusion of other materials as comonomers, and some of the resulting interpolymers have had wide usage, there is still much interest and need for alternative procedures and materials whereby the properties of halo-substituted ethylene polymers can be altered. The choice of possible comonomers is somewhat limited, in that problems of self-compatibility, i. e., homogeneity, are encountered with many interpolymers. Interpolymers of the present invention have excellent homogeneity, despite the wide difference in character of the halo-substituted ethylenes on the one hand and vinylene carbonate on the other hand. Further, the interpolymers of this invention exhibit increased compatibility with other polymeric and resinous materials, as compared with the homopolymers of the halo-substituted ethylenes. Additionally, incorporation of vinylene carbonate in the polymer molecule provides reactive vinylene carbonate units therein, or upon hydrolysis reactive hydroxyl-containing units, whereby the polymers can be modified by reaction with other reagents, for example with cross-linking agents, e. g., polycarboxylic acids, to "cure" the polymer. The foregoing advantages are found to greater or lesser extent in interpolymers of vinylene carbonate with halo-substituted ethylenes in which the monomeric constituents are employed in all possible proportions, but the advantages just discussed are of particular value and interest in those interpolymers obtained by subjecting to interpolymerization a monomeric material comprising a major proportion by weight of a halo-substituted ethylene and a minor proportion by weight of vinylene carbonate. On the other hand, interpolymers high in vinylene carbonate content are improved in many of their properties by the inclusion of a minor weight proportion of one or more halo-substituted ethylenes, whereby the softening point, resistance to solvent, and processability can be improved.

In practicing those embodiments of the invention wherein the interpolymerization is effected at high pressures, one or more of the following advantages will be realized over polymerizations effected at ordinary pressures; much faster polymerization rate than obtained at ordinary pressures; much smaller quantity of catalyst needed; greater homogeneity of copolymers; more flexible copolymers; better compatibility of vinylene carbonate/halo-substituted ethylene copolymers with other polymeric materials; tougher polymers due to increased molecular weight; polymerization can be conducted at appreciably lower temperatures; polymerization can be carried to higher conversion.

The words "copolymerization" and "interpolymerization" (and "copolymer" and "interpolymer") are used synonymously in the present application and are inclusive of the preparation of polymers (and polymers prepared) from vinylene carbonate admixed with a single comonomer, or admixed with two or more comonomers.

Preferred embodiments of the present invention employ high pressures for the interpolymerization of vinylene carbonate with one or more other unsaturated organic compounds copolymerizable therewith including at least one halo-substituted ethylene as an essential polymerizable component. While some advantages are obtained at pressures of from 1,000 to 5,000 pounds per square inch, the pressure should be at least 5,000 pounds per square inch for best results. Pressures of at least 15,000 pounds per square inch are more preferably employed, and often optimum results are obtained at pressures within the range of 15,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture disks, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures employed in the present invention are no barriers to the commercial use of the process.

The polymerization, whether at high pressure or ordinary pressure, can be carried out at temperatures within fairly broad range, which is preferably 35° C. to 125° C. The higher temperatures tend to result in a discolored product, probably by decomposition of vinylene carbonate and/or vinylene carbonate units in the polymer molecule. However, in equipment and at conditions adapted for obtaining rapid polymerization and satisfactory heat removal, tolerance towards high temperatures is considerably improved. In any event, a temperature sufficiently high within the operative range should be used to give a reasonable reaction rate. The preferred range is 50° C. to 100° C.

As used herein, the term "polymer" is to be taken broadly as meaning interpolymers or copolymers of vinylene carbonate with other monomers copolymerizable therewith including as essential ingredients at least one halo-substituted ethylene copolymerizable therewith, and telomers of vinylene carbonate plus such other monomers. In other preferred embodiments of the invention, vinylene carbonate is subjected at high pressures to polymerization in the presence of one or more other monomers (termed interpolymerization or copolymerization), said other monomers being as described herein, resulting in polymeric products containing units not only of vinylene carbonate but also of said one or more other monomers in the polymer. The products of polymerizing mixed monomers may be largely or entirely true copolymers wherein a single molecule is built up of units of each monomer, or may sometimes contain appreciable quantities of mixed homopolymers. The copolymerizations at high pressures permit more rapid polymerization to occur, better yields, and high molecular weight products. Additionally, the copolymer products are usually more self-compatible, i. e., homogeneous, than when copolymerization is attempted at ordinary conditions. While such ordinary conditions are quite suitable for copolymerizing vinylene carbonate with some of the halo-substituted ethylenes, such as vinyl chloride, vinylidene chlorofluoride, vinylidene chloride, they are quite unsuitable for copolymerizing vinylene carbonate with many of the halo-substituted ethylenes, such as trifluorochloroethylene, tetrafluoroethylene, vinylidene fluoride, vinyl fluoride.

Any of the vinylene carbonate/halo-substituted ethylene interpolymers described herein, including telomers, can have part or all of the vinylene carbonate units therein hydrolyzed to corresponding hydroxyl-containing units.

This invention is of generic application to the formation of polymers from all copolymerizable mixtures of vinylene carbonate with one or more monomeric materials including at least one halo-substituted ethylene. Among the halo-substituted ethylenes of particular interest are the vinyl and vinylidene halides, for example vinyl chloride, vinyl fluoride, vinyl bromide, vinyl iodide, vinylidene chloride, vinylidene fluoride, 1-fluoro-1-chloroethylene, 1-fluoro-1-bromoethylene, vinylidene bromide. Another preferred group of halo-substituted ethylenes are the polyfluoroethylenes of the general formula $CF_2=CXY$ wherein X is H, Cl, or F, and Y is Cl or F, for example tetrafluoroethylene, chlorotrifluoroethylene, trifluoroethylene, 1,1-dichloro-2,2-difluoroethylene. Examples of other halo-substituted ethylenes include 1,2-dichloroethylene, 1-fluoro-2-bromoethylene, 1,2-difluoro-1-chloroethylene, 1,1-difluoro-2-chloro-2-bromoethylene.

The invention in its broadest aspects is not departed from by providing, in addition to one or more halo-substituted ethylenes and vinylene carbonate, other monomeric materials capable of entering into the polymerization reaction. Thus, vinyl acetate, propylene, styrene, acrylonitrile, ethylene, methyl methacrylate, ethyl vinyl ether, butadiene, acetylenic compounds including acetylene itself, carbon monoxide, sulfur dioxide, and other compounds copolymerizable with the halo-substituted ethylene and vinylene carbonate, can be used. This, of course, will affect the polymer properties but the amount can be chosen so as to retain the advantageous results of the copolymerization of vinylene carbonate with halo-substituted ethylenes. For most purposes, however, it is preferred that the monomeric material be made up only of vinylene carbonate plus one or more halo-substituted ethylenes.

Specific examples of copolymers obtained when the process of this invention is employed with mixtures of vinylene carbonate with other ethylenically unsaturated compounds including at least one halo-substituted ethylene, include: vinylene carbonate/vinyl chloride, vinylene carbonate/tetrafluoroethylene, vinylene carbonate/vinylidene chlorofluoride, vinylene carbonate/vinyl chloride/vinylidene chlorofluoride, vinylene carbonate/chlorotrifluoroethylene/ethylene, vinylene carbonate/vinyl chloride/vinyl acetate, vinylene carbonate/vinylidene chloride/vinyl chloride, vinylene carbonate/vinylidene fluoride/tetrafluoroethylene, vinylene carbonate/vinylidene chloride/vinyl methyl ketone, vinylene carbonate/vinyl fluoride/isobutylene, vinylene carbonate/1,2-dichloroethylene, vinylene carbonate/vinylidene bromide, vinylene carbonate/trifluoroethylene.

It will of course be understood that all halo-substituted ethylene monomers discussed herein are by no means equivalent one to the other when used to interpolymerize with vinylene carbonate, for amongst these various monomers great differences are found in ease of copolymerization and the character of product obtainable.

The invention encompasses the copolymerization of vinylene carbonate with halo-substituted ethylenes in all proportions. Most copolymers will contain from 5 to 95 weight percent vinylene carbonate and from 95 to 5 weight percent of one or more halo-substituted ethylenes, based on the combined weights of the monomers entering into the copolymer. In its broadest aspects the invention contemplates the production of polymers of vinylene carbonate containing the smallest significant quantity of any one or more of the halo-substituted ethylenes, which may be 1 weight percent or less, and at the other extreme the production of polymers of halo-substituted ethylenes containing the smallest significant quantity of vinylene carbonate, which may be 1 weight percent or less, and all proportions between those extremes. It will be clear that vinylene carbonate can be copolymerized, in accordance with this invention, with one, two, three or more different comonomers in a single polymerization to provide interpolymers containing vinylene carbonate units plus units of one or more comonomers.

Amongst the copolymers of the invention are those containing a major proportion of vinylene carbonate by weight and a minor proportion of a halo-substituted ethylene, usually in comparatively small amount to modify somewhat the character of the polymer which, however, will still retain many of the characteristics of vinylene carbonate homopolymer. Such modifications permit variations in properties such as solubility in given solvents, molecular weight, resistance to burning, softening point, rigidity, surface active properties of hydrolyzed copolymers, and the like. For many purposes, however, the most useful copolymers are those wherein the vinylene carbonate constitutes a minor percentage by weight of the copolymer, often 25 percent or less by weight, giving products which retain many of the characteristics of the homopolymer of the particular halo-substituted ethylene comonomer (or comonomers) employed. Such use of minor amounts of vinylene carbonate in a copolymer generally will increase the flexibility of the polymer, the greater the percentage of vinylene carbonate the greater the flexibility, and this of course is very useful in many applications. Most if not all of the properties of flowability, softening point, general processability on polymer handling equipment, and solubility, will be improved. Such copolymers when produced at high pressures are generally much more self-compatible, i.e., homogeneous, than if their production is attempted at ordinary pressures.

They also exhibit increased compatibility towards other polymeric materials, including natural and synthetic resins and elastomers. The use of minor amounts of vinylene carbonate in the interpolymers also permits the introduction of chosen percentages of hydrolyzable vinylene carbonate units, which can be partially or completely hydrolyzed to give the corresponding

units in the molecule which increases the adhesiveness of the polymer towards most solids, and the affinity of the polymer toward water and various oxygenated organic solvents such as alcohols, ketones, and the like. Further, the vinylene carbonate units can be reacted directly, or usually after hydrolysis to hydroxyl-containing units, with a variety of reagents to add other functional groups to the polymer molecule and/or to cross-link polymer molecules.

Copolymers of vinylene carbonate and halo-substituted ethylenes produced in accordance with the present invention are inclusive of modified polymeric products known as telomers, obtained by carrying out the polymerization in the presence of materials which are non-polymerizable under the conditions employed but which combine with a plurality of units of the monomers. The products obtained by such a telomerization or chain-transfer reaction may be represented by the formula $Y(A)_nZ$ wherein A is a divalent radical formed from a monomeric material comprising vinylene carbonate and a halo-substituted ethylene and containing at least one vinylene carbonate unit and at least one halo-substituted ethylene unit, $n$ is an integer of 2 to 50 or even higher, and Y and Z are fragments terminally attached to a chain of monomer units, which fragments together form a molecule of the non-polymerizable compounds such as halogenated compounds, e. g., carbon tetrachloride, acids, e. g., isobutyric acid and anhydride; esters, e. g., methyl propionate; acetals, e. g., dioxolane, mercaptans, bisulfites, alcohols, ethers, silicon halides, hydrogen chloride and similar compounds.

While under some conditions vinylene carbonate may be copolymerized with a halo-substituted ethylene without the use of an added catalyst, it is much preferred to employ sufficient catalyst to give a reasonable reaction rate. Suitable catalysts include those of the free-radical promoting type, principal among which are peroxide-type polymerization catalysts, and azo-type polymerization catalysts. Those skilled in the art are now fully familiar with a large number of peroxide-type polymerization catalysts and a suitable one can be chosen readily by simple trial. Such catalysts can be inorganic or organic, the latter having the general formula R'OOR" wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example suitable peroxide-type catalysts include benzoyl peroxide, tertiary butyl peroxide, tertiary butyl hydroperoxide, diacetyl peroxide, diethyl peroxycarbonate, dimethylphenyl hydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N—; the dangling valences can be attached to a wide variety of organic radicals, at least one however preferably being attached to a tertiary carbon atom. By way of example of suitable azo-type catalysts can be mentioned α,α'-azodiisobutyronitrile, diazoaminobenzene, azobis-(diphenylmethane), and α,α'-azo-bis-α, γ-dimethylvaleronitrile. The peroxy-type or azo-type polymerization catalyst is used in small but catalytic amounts, which are generally not in excess of 1 percent by weight based on the monomeric material. A suitable quantity is often in the range of 0.001 to 0.5 percent by weight. It will, of course, be understood that one catalyst will not necessarily be the full equivalent of another in all respects.

The polymerization, especially when conducted at high pressure, can be effected in the presence of small but catalytic amounts of molecular oxygen. While this can be supplied in the form of air or other gases containing molecular oxygen, it is preferred to use essentially pure oxygen. The quantity will usually be within the range of 10 to 200 parts oxygen per million parts monomeric material, on the weight basis.

The polymerization can also be effected under the influence of ionizing radiation of polymerizing intensity in accordance with the general procedures described and claimed in the copending application of William H. Yanko and John D. Calfee, Serial No. 318,098, filed October 31, 1952. Ionizing radiation that can be employed to effect polymerization at high pressures includes α-radiation and β-radiation, but is preferably electromagnetic radiation of high frequency not deflected by electric or magnetic fields and of great penetrative value, e. g., gamma rays and X-rays. Gamma-radiation arising from a radioactive substance, for example cobalt-60, tantalum-182, potassium-40, etc. is a convenient and preferred source.

A reaction time chosen for a given copolymerization of vinylene carbonate with a halo-substituted ethylene will depend among other things, on the percentage conversion desired, and the polymerization system employed. High conversions, approaching 100 percent of the monomers can often be obtained. In many instances it is desired to limit the extent of conversion to a value appreciably less than 50 weight percent of the monomeric material charged, for example from 10 to 30 percent conversion. Of course, any unconverted monomers are recovered from the final reaction mixture and recycled, with purification if necessary, to the polymerization, or utilized as charge stock to another polymerization. Those skilled in the art will, of course, appreciate that reaction time is one variable which is interdependent with other reaction variables; particularly pressure, catalyst, amount of catalyst, purity of monomers, proportions of the monomers, the presence or absence of added reaction media, and whether the reaction is a batch or a continuous one. In some instances it may be desired to employ a reaction time of several days, but ordinarily reaction time not in excess of about 24 hours is satisfactory. For batch reactions, reaction times of 1 to 20 hours are usually preferred. For continuous reactions, the reaction times are ordinarily shorter, and they range in a continuous flow system from a few minutes up to a few hours, for example from 1 minute to 5 hours. As pointed out hereinabove, the use of high pressures in the preferred embodiments of the present process generally enables the use of greatly shortened reaction times as compared with similar polymerizations at ordinary pressures.

The polymerization can be effected in accordance with the present invention in bulk or mass, i. e., in reaction mixtures consisting solely of vinylene carbonate, the comonomer or comonomers employed, and any catalyst employed. However, the polymerization can also be carried out in the presence of added reaction media, for example gaseous or liquid carrying fluids, e. g., water, or organic liquids which may or may not have a solvent action on the polymeric product, e. g., acetone, benzene, xylene, cyclohexanone, hexane, dioxane, methyl ethyl ketone. The use of added non-reacting fluid reaction media is particularly useful in a continuous flow process. When water is used as an added reaction medium, it is permissible to employ additionally suspending and/or emulsifying agents in small amounts which aid in the suspension or actual emulsification of the monomers and copolymer product in the water. Whether or not such materials are used, vigorous agitation is useful, when employing water as a reaction medium, e. g., as by stirring in a batch reactor, or by use of turbulent flow conditions in a continuous flow polymerization. Liquid reaction media assist in controlling the reaction temperature, since the polymerization is highly exothermic. Suitable proportions of water are, for example from 0.5 to 5 parts by weight per part of monomeric material. If a solvent or a non-solvent liquid organic reaction or carrying medium is to be used, ordinarily at least 1 part by weight, up to 5 or 10 parts, per part of monomeric material will be suitable. Adequate provision should be made for removing the exothermic heat of reaction and thus avoiding too severe a temperature build-up during the polymerization.

Although effecting all of the copolymerizations of the present invention at high pressures has various advantages, as discussed herein, certain of the halo-substituted ethylenes, among which can be particularly mentioned vinyl chloride, vinylidene chloride, and vinylidene chlorofluoride, are very effectively copolymerized with vinylene carbonate at ordinary pressures, i. e., atmospheric, sub-atmospheric, or moderately super-atmospheric pressure. This can be accomplished by mass polymerization, and such is preferred in the case of vinylidene chlorofluoride (1-chloro-1-fluoroethylene). For vinyl chloride and vinylidene chloride, and mixtures of same, their copolymerization with vinylene carbonate at such ordinary pressures is preferably carried out by suspension or emulsion techniques. For suspension polymerization a reaction medium such as water is used together with a small amount of a suspending agent, for example tricalcium phosphate or a vinyl acetate/maleic anhydride copolymer product, to give a suspension of particles of initial reaction mixture of sufficiently large size as to prevent the formation of a permanently stable latex of the polymer product. The polymer is thus obtained in the form of small beads or "pearls." To effect emulsion polymerization, sufficient amount of emulsifying agent, for example a water-soluble salt of a sulfonated long chain alkyl aromatic compound, is employed in suitable quantity along with vigorous agitation whereby an emulsion of the reactants in water is formed and the product is obtained in the form of a latex. The latex can then be coagulated if desired by known methods and the polymer separated from the water. In these aqueous systems, "redox" catalysts, i. e., combinations of reducing agents and oxidizing agents, are especially useful, and many such redox catalyst systems are well known to those skilled in the polymerization art. The oxidizing agent is generally a peroxide or hydroperoxide, while the reducing agent may be, for example, an inorganic sulfite or a polyamine.

The term "monomeric material" as used herein refers to the polymerizable material which is vinylene carbonate together with copolymerizable monomer or monomers as described herein, including at least one halo-substituted ethylene as an essential copolymerizable component. The use of the term "monomeric material" does not necessarily imply either the presence or absence of additional materials, such as solvents, non-solvent liquids, catalysts, other polymers in preformed state, suspending agents, fillers, and the like. In other words, such materials can be either present or absent, unless the absence or presence of same is specifically discussed.

Under suitable conditions, vinylene carbonate monomer units in the polymeric material can undergo hydrolysis, resulting in the presence of units of the following type in the polymer:

The extent of hydrolysis may range from only a very small percentage of the vinylene carbonate units in the polymeric material up to essentially complete hydrolysis, depending upon the conditions of treatment. When the polymerization is effected in the presence of water, a limited amount of hydrolysis can be expected to occur, especially if the aqueous medium is acidic or alkaline. Simple polymerization in the presence of water does not appear to effect a great deal of hydrolysis of vinylene carbonate monomer, or vinylene carbonate units in the polymer. Of course, the longer the reaction time the more extensive the hydrolysis that can be expected to occur. It may often be desirable to obtain hydrolysis of vinylene carbonate units in the polymer. The presence of hydroxyl groups in the polymer provides points for further reaction with all sorts of reagents, e. g., aldehydes to produce acetals, and imparts water-sensitivity and often adhesiveness to the polymer. Where the percentage of vinylene carbonate in the copolymer is sufficiently high, a water-soluble polymer can be made by hydrolysis. The same methods of hydrolysis can be used on the copolymers described herein as are employed in hydrolyzing vinyl acetate polymers to form polyvinyl alcohols. Such methods are numerous and are well known in the art.

The following examples provide details of certain preferred embodiments of the invention. The data are to be taken as exemplary, and the invention in its broadest aspects is not limited to the particular conditions and proportions set forth therein.

*Example 1*

The copolymerization of vinyl chloride with vinylene carbonate was effected in a high pressure shaker reaction bomb. This bomb was provided with thermocouples to measure the reaction temperature, and was connected by high pressure tubing to a water reservoir, water being used to pressure and to control the pressure on the reaction mixture.

Into the bomb, surrounded by ice, was placed 0.03 gram benzoyl peroxide catalyst, and 20 grams vinylene carbonate. The bomb was closed, chilled in Dry Ice (solid $CO_2$), and thereafter evacuated while at Dry Ice temperature. The chilled evacuated bomb was then charged with 125 grams vinyl chloride.

The bomb was placed in the shaker, pressured with water to 25,000 pounds per square inch, and maintained at a reaction temperature of 75° C. for 16 hours.

There resulted the formation of 132 grams of a high molecular weight vinyl chloride/vinylene carbonate copolymer. This material was molded under heat and pressure into a clear, stiff but flexible (not brittle) sheet.

*Example 2*

In the manner and in the apparatus described in Example 1, the bomb was charged with 95 grams vinyl fluoride, 5 grams vinylene carbonate and 0.05 gram $\alpha,\alpha'$-azodiisobutyronitrile catalyst, and pressure to 17,000 pounds per square inch. A temperature of 75° C. was maintained for 3 hours.

There was recovered 25 grams of clear, hard vinyl fluoride/vinylene carbonate copolymer.

Normally solid thermoplastic copolymers of vinylene carbonate with halo-substituted ethylenes made in accordance with the present invention, can be put to a variety of uses, depending of course in large measure on the choice of halo-substituted ethylene comonomer and the proportions of monomers, and to a lesser extent on the conditions of the polymerization. Thus, in general they can be subjected to conventional injection molding and compression molding operations, can be cast as films from solvents by known techniques, solutions of the polymer can be extruded into various forms, including extrusion in the form of fibers or films into a non-solvent liquid or into a gas effecting evaporation of solvent, or can be extruded in various forms in the absence of any solvent. Such polymers can be worked on mills alone or in admixture with other plastic materials in known manner. Copolymers of vinylene carbonate with halo-substituted ethylenes when made at high pressures as described herein will often be found to be much more compatible with other resins and polymeric materials in general than when made at ordinary pressures. Plasticizers, modifiers, fillers, stabilizers, pigments and the like can be incorporated into copolymers made in accordance with this invention. It will be appreciated that the characteristics of the numerous copolymers made under varying polymerization conditions and with varying proportions of vinylene carbonate and comonomers will cover a wide range. Those skilled in the art, having had the benefit of the present disclosure, can choose suitable proportions of vinylene carbonate and halo-substituted ethylene comonomers, and suitable polymerization conditions, for producing polymers of the desired characteristics. For most purposes, we prefer the copolymers prepared from a major proportion by weight of halo-substituted ethylene and a minor proportion by weight of vinylene carbonate sufficiently small to produce poly(halo-substituted ethylene)-like characteristics. Although comonomers other than vinylene carbonate and halo-substituted ethylenes can be employed, we prefer the interpolymers whose monomer units consist essentially of vinylene carbonate and one or more halo-substituted ethylenes. High molecular weight normally solid thermoplastic copolymers are preferred. However, low molecular weight semi-solid to liquid polymers, made by suitable procedures, for example telomerization as described hereinabove, are within the broad scope of the invention.

This application is a continuation-in-part of our copending application, Serial No. 355,860, filed May 18, 1953, now abandoned. It is also related to our copending application, Serial No. 355,859, filed May 18, 1953, wherein vinylene carbonate is copolymerized with ethylene, the ethylene being an essential component of the monomeric mixture and resulting copolymer. It is also related to our copending application, Serial No. 550,828, filed of even date with the present application, wherein vinylene carbonate is homopolymerized or is copolymerized with an unsaturated organic compound copolymerizable therewith and having at least three carbon atoms in the molecule, at a pressure of at least 5,000 pounds per square inch.

While the invention has been described with particular reference to various preferred embodiments thereof, it will be appreciated that variations from the details given herein can be effected without departing from the invention in its broadest aspects.

We claim:

1. A process which comprises interpolymerizing vinylene carbonate with a halo-substituted ethylene at a pressure of at least 5,000 pounds per square inch and a temperature within the range of 35° C. to 125° C.

2. A process according to claim 6 wherein said halo-substituted ethylene is a vinylidene halide.

3. A process according to claim 6 wherein said halo-substituted ethylene is a vinyl halide.

4. A process which comprises interpolymerizing vinylene carbonate with vinyl chloride at a pressure of at least 5,000 pounds per square inch and a temperature within the range of 35° C. to 125° C.

5. A process which comprises interpolymerizing vinylene carbonate with vinyl fluoride at a pressure of at least 5,000 pounds per square inch and a temperature within the range of 35° C. to 125° C.

6. A process which comprises interpolymerizing vinylene carbonate with a halo-substituted ethylene at a pressure of at least 5,000 pounds per square inch.

7. The interpolymerization of vinylene carbonate with vinyl chloride at a pressure of at least 5,000 pounds per square inch.

8. The interpolymerization of vinylene carbonate with vinyl fluoride at a pressure of at least 5,000 pounds per square inch.

9. A process which comprises interpolymerizing a major proportion by weight of a halo-substituted ethylene with a minor proportion by weight of vinylene carbonate at a pressure of at least 5,000 pounds per square inch and a temperature within the range of 35° C. to 125° C.

10. A process which comprises subjecting a monomeric material comprising a major proportion by weight of a halo-substituted ethylene and a minor proportion by weight of vinylene carbonate to interpolymerization at a pressure of at least 5,000 pounds per square inch.

11. A process which comprises subjecting a monomeric material comprising a halo-substituted ethylene and up to 25 weight percent, based on total monomeric material, of vinylene carbonate, to interpolymerization at a pressure within the range of 15,000 to 40,000 pounds per square inch.

12. An interpolymer of vinylene carbonate with a halo-substituted ethylene.

13. An interpolymer of vinylene carbonate with a vinylidene halide.

14. An interpolymer of vinylene carbonate with a vinyl halide.

15. An interpolymer of vinylene carbonate with vinyl chloride.

16. An interpolymer of vinyene carbonate with vinyl fluoride.

17. An interpolymer whose monomer units consist essentially of vinylene carbonate in a minor proportion by weight and vinyl chloride in a major proportion by weight.

18. An interpolymer whose monomer units consist essentially of vinylene carbonate in a minor proportion by weight and vinyl fluoride in a major proportion by weight.

References Cited in the file of this patent

UNITED STATES PATENTS

| | | |
|---|---|---|
| 2,563,771 | Adelson | Aug. 7, 1951 |
| 2,722,525 | Price et al. | Nov. 1, 1955 |
| 2,733,228 | Salyer et al. | Jan. 31, 1956 |